Aug. 7, 1951 A. KEEFE 2,563,787
PNEUMATIC TIRE
Filed July 28, 1947
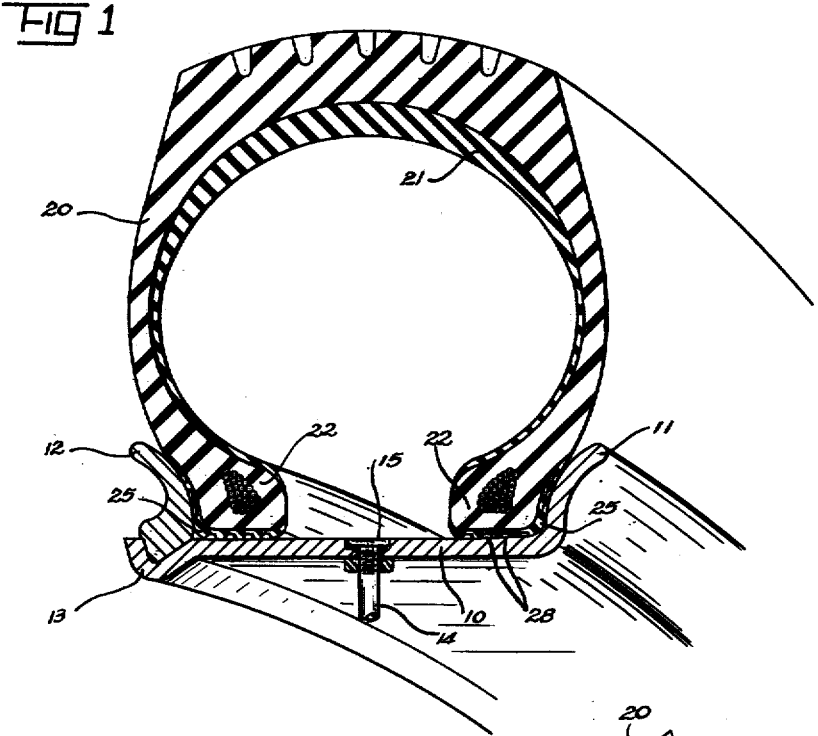
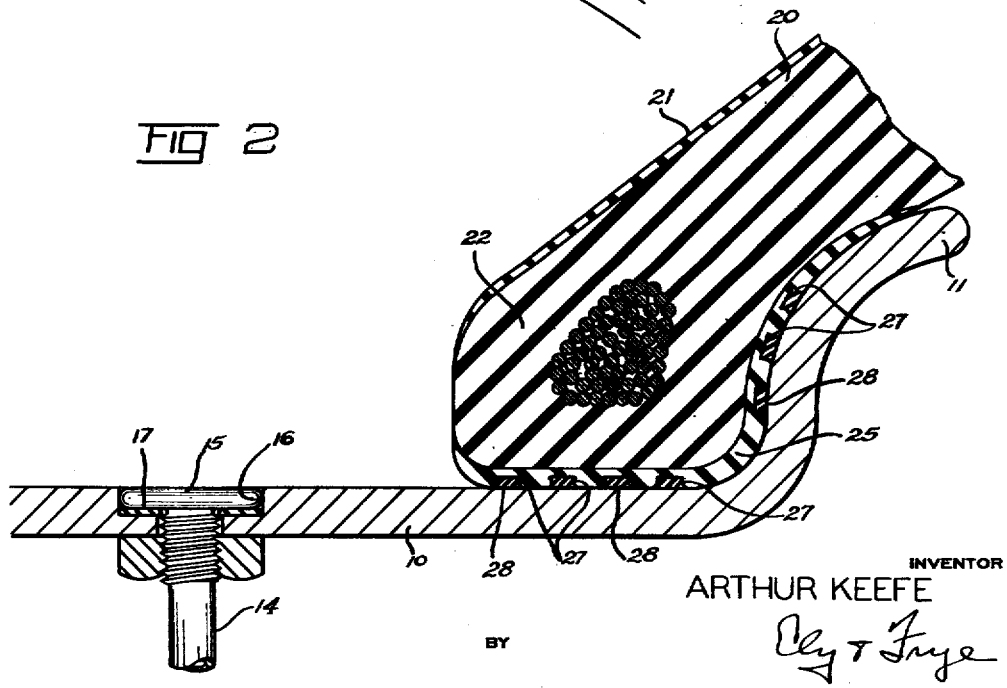
INVENTOR
ARTHUR KEEFE
BY
ATTORNEYS Patented Aug. 7, 1951

2,563,787

UNITED STATES PATENT OFFICE 2,563,787

PNEUMATIC TIRE

Arthur Keefe, Akron, Ohio, assignor of twenty-four and one-half per cent to Robert B. Romweber and twenty-four and one-half per cent to Richard J. Romweber, both of Akron, Ohio Application July 28, 1947, Serial No. 764,201

5 Claims. (Cl. 152—362)

This invention relates to pneumatic tires, and more especially it relates to tire construction having especial utility in tubeless pneumatic tires.

One of the problems obstructing the extended use of tubeless pneumatic tires is the escape of pneumatic pressure therefrom. Such pressure may escape around the valve stem of the tire where the stem extends through the tire rim, or it may escape past the bead portions of the tire where they seat upon the tire rim, especially if the tire is subjected to rough usage sufficient to displace the bead portions of the tire from the bead seats of the rim. It is to the relief of this condition that this invention primarily is directed.

The chief objects of the invention are to prevent the escape of inflation pressure from a tubeless pneumatic tire, especially at the bead portions of the latter; to provide in an improved manner for effecting an air-tight seal of the tire beads upon the bead seats of a tire rim on which the tire is mounted; and to obviate the use of extraneous elements in the tire for excluding the inflating medium therein from access to the juncture of tire beads and rim bead seats. Other objects will be manifest as the description proceeds.

Of the accompanying drawing:

Fig. 1 is a fragmentary sectional perspective view of a tubeless pneumatic tire embodying the invention, and a flat-base tire rim on which the tire is mounted; and Fig. 2 is a fragmentary sectional detail, on a larger scale, of the novel feature of the tire shown in Fig. 1.

Referring to the drawing, there is shown an endless flat-base tire rim 10 upon which the tire of the invention is mounted. The rim 10 has the usual fixed lateral flange 11 on one margin thereof, and the usual removable flange 12 mounted in a gutter 13 on the other margin thereof. The rim 10 departs from conventional construction by having a valve stem 14 mounted therein in the central plane of the rim. The valve stem 14 has the usual head or flange 15 formed on one end thereof, and said flange is received in a counterbore or recess 16 in the periphery of the rim. A suitable gasket or washer 17 of resilient material is disposed beneath the flange 15 to prevent the passage of air past the valve stem, said flange being flush with the peripheral surface of the rim to enable a tire bead to pass thereover during the mounting of a tire upon the rim. It will be understood that the specific rim 10 is shown only for illustrative purposes, and that other types of rims, such as the drop-center rim, may be employed with the tire of the invention if desired.

Mounted upon the tire rim 10 is a tubeless pneumatic tire casing that is designated as a whole by the numeral 20. In its general features of carcass and tread construction, the tire 20 conforms to conventional practice. Preferably, however, the tire has an inner lining or facing 21 of any suitable puncture-sealing composition, which composition extends from one of its beads 22 to the other, and being much thicker directly back of the tread portion of the tire. The consistency of the puncture-sealing composition is such that if the tire is punctured by a nail or similar instrument, the composition will adhere to the same and prevent escape of air, and will flow into and seal the puncture when the instrument is withdrawn.

A salient feature of the improved tire construction is the provision of means constituting an air-seal between the tire beads 22, and the rim-flanges 11, 12, and rim-base with which said tire beads are engaged. Said air seal consists of a layer 25 of relatively stiff rubber or rubber-like composition extending circumferentially of the tire upon the inner circumferential face and contiguous outer lateral face of each tire bead 22. The layer 25 may be of the same composition that is employed for the tread portion of the tire; thus while it is relatively stiff, it has a modicum of resilience, which distinguishes the tire from conventional tire constructions wherein of these surfaces are of rubber-impregnated fabric and are hard and unyielding.

Formed in the layer 25 are a plurality of parallel grooves 27, 27, that extend circumferentially of the tire, some of which grooves are in the inner circumferential face of each tire bead and some are in the contiguous outer lateral face thereof. Each of the grooves 27 is filled with a plastic composition 28 that is relatively soft as compared to the stock of which the layer 25 is composed. The plastic composition 28 is of a type that does not harden with age, such as conventional calking compound. It is filled into the grooves 27 after the tire has been vulcanized.

The tire 20 is mounted upon the rim 10 in the usual or customary manner, but more expeditiously because of the absence of an inner tube. After the tire is secured on the rim by replacement of the flange 12, said tire is inflated through the agency of the valve stem 14, with the result that the bead portions 22 of the tire are forced apart, away from each other, into strong engagement with the lateral flanges 11, 12, of the rim. If the tire rim is of the type that has sloped or tapered bead seats, the beads of the tire will be wedged thereonto. When the tire beads are urged against the rim-base and rim-flanges as described, the facing layer 25 thereon is subjected to compressive stress which will deform or flatten the grooves 27 and force the flowable plastic composition 28 therein more firmly into surface contact with the rim structure.

The arrangement is such that the plastic composition compensates for any irregularities, indentations, or the like in structure of the tire beads or the tire rim, and forms a series of circumferentially extending, air-impervious dams that obstruct the passage of air under pressure past the bead portions of the tire. The friction between the layer 25 and plastic 28 with the rim structure is adequate to transmit the necessary driving torque to the tire.

From the foregoing it will be apparent that the invention provides in a simple and efficient manner for preventing leakage of air from tubeless pneumatic tires, and achieves the other advantages set out in the foregoing statement of objects.

Modification may be resorted to without departing from the spirit of the invention, or the scope thereof as defined by the appended claims.

What is claimed is:

1. The combination which comprises a tire rim, a tubeless pneumatic tire thereon, a valve stem mounted in the rim and having air-tight connection therewith for effecting inflation of the tire, and composition characterized by substantially permanent plasticity embedded in the bead portions of the tire and disposed between said bead portions and the bead-sealing portions of the rim on which they are mounted.

2. A tire of the character described comprising bead portions adapted to seat upon a tire rim, and composition characterized by substantially permanent plasticity embedded in and disposed adjacent to those faces of said bead portions that bear against said tire rim when mounted thereon so as to be adapted to engage said tire rim.

3. A tire of the character described comprising bead portions adapted to seat upon a tire rim, depressions in the surfaces of the said bead portions that make contact with a tire rim when mounted thereon, and substantially permanently plastic composition filling said depressions.

4. A combination as defined in claim 3 whereof the depressions are grooves extending circumferentially of the tire.

5. A tire of the character described comprising bead portions adapted to seat upon a tire rim, a layer of relatively stiff, deformable rubber composition similar to tread stock on those faces of each bead portion that makes contact with a tire rim when mounted thereon, grooves formed in said rubber layers extending circumferentially of the tire, and substantially permanent by plastic composition filling said grooves.

ARTHUR KEEFE.

REFERENCES CITED

The following references are of record in the file of this patent:

UNITED STATES PATENTS

| Number | Name | Date |
| --- | --- | --- |
| 1,389,024 | Baldwin | Aug. 30, 1921 |
| 1,754,836 | Schenuit | Apr. 15, 1930 |
| 2,028,165 | Pierce | June 21, 1936 |